United States Patent
Neet et al.

(10) Patent No.: US 9,887,607 B2
(45) Date of Patent: Feb. 6, 2018

(54) METHOD FOR FORMING AND ANNEALING AN INSULATED CONDUCTOR

(71) Applicant: REMY TECHNOLOGIES, L.L.C., Pendleton, IN (US)

(72) Inventors: Kirk Neet, Pendleton, IN (US); Katherine S. Riley, Alexandria, IN (US); James P. Murphy, Greenfield, IN (US)

(73) Assignee: BORGWARNER INC., Auburn Hills, MI (US)

(*) Notice: Subject to any disclaimer, the term of this patent is extended or adjusted under 35 U.S.C. 154(b) by 831 days.

(21) Appl. No.: 14/058,780

(22) Filed: Oct. 21, 2013

(65) Prior Publication Data

US 2015/0107728 A1    Apr. 23, 2015

(51) Int. Cl.
*H01B 19/00*    (2006.01)
*H02K 15/04*    (2006.01)

(52) U.S. Cl.
CPC ..... *H02K 15/0421* (2013.01); *Y10T 29/49117* (2015.01); *Y10T 29/49227* (2015.01)

(58) Field of Classification Search
CPC ......... Y10T 29/49117; Y10T 29/49227; Y10T 29/49002; H01B 13/00; H01B 13/0016; H01B 13/0006; H01B 13/0036; H02K 15/0421
USPC ................................ 29/825, 592.1; 148/516
See application file for complete search history.

(56) References Cited

U.S. PATENT DOCUMENTS

| | | | | |
|---|---|---|---|---|
| 2,286,759 A | * | 6/1942 | Patnode | B05D 3/12 118/DIG. 18 |
| 3,312,773 A | * | 4/1967 | Lit | H01B 7/18 174/119 R |
| 4,877,467 A | * | 10/1989 | Marsden | H01B 7/0275 156/51 |
| 5,254,806 A | | 10/1993 | Gross et al. | |
| 5,271,777 A | * | 12/1993 | Duffy | C21D 9/525 148/537 |
| 2009/0236005 A1 | * | 9/2009 | Bowman | H02K 15/0421 140/92.2 |
| 2012/0152590 A1 | | 6/2012 | Yin | |

(Continued)

FOREIGN PATENT DOCUMENTS

| | | |
|---|---|---|
| EP | 2133885 A1 | 12/2009 |
| JP | 04196571 A * | 7/1992 |

OTHER PUBLICATIONS

International Search Report and Written Opinion, International Application No. PCT/US2014/061344, dated Jan. 22, 2015, Korean Intellectual Property Office, Internaitonal Search Report 5 pages; Written Opinion 9 pages.

*Primary Examiner* — Peter DungBa Vo
*Assistant Examiner* — Azm Parvez
(74) *Attorney, Agent, or Firm* — Cantor Colburn LLP

(57) ABSTRACT

A method of forming an insulated conductor, includes forming an insulated conductor to modify a cross sectional shape thereof. Heating at least a portion of the insulated conductor to a selected temperature range. Maintaining the selected temperature range for at least a selected period of time thereby annealing the conductor. Forming the insulated conductor into a plurality of gable shaped loops; and maintaining insulating properties of an insulation layer of the insulated conductor. Also included is a method of annealing an insulated conductor.

17 Claims, 6 Drawing Sheets

(56) References Cited

U.S. PATENT DOCUMENTS

2013/0042949 A1\* 2/2013 Sagawa ..................... C22F 1/08
148/576

\* cited by examiner

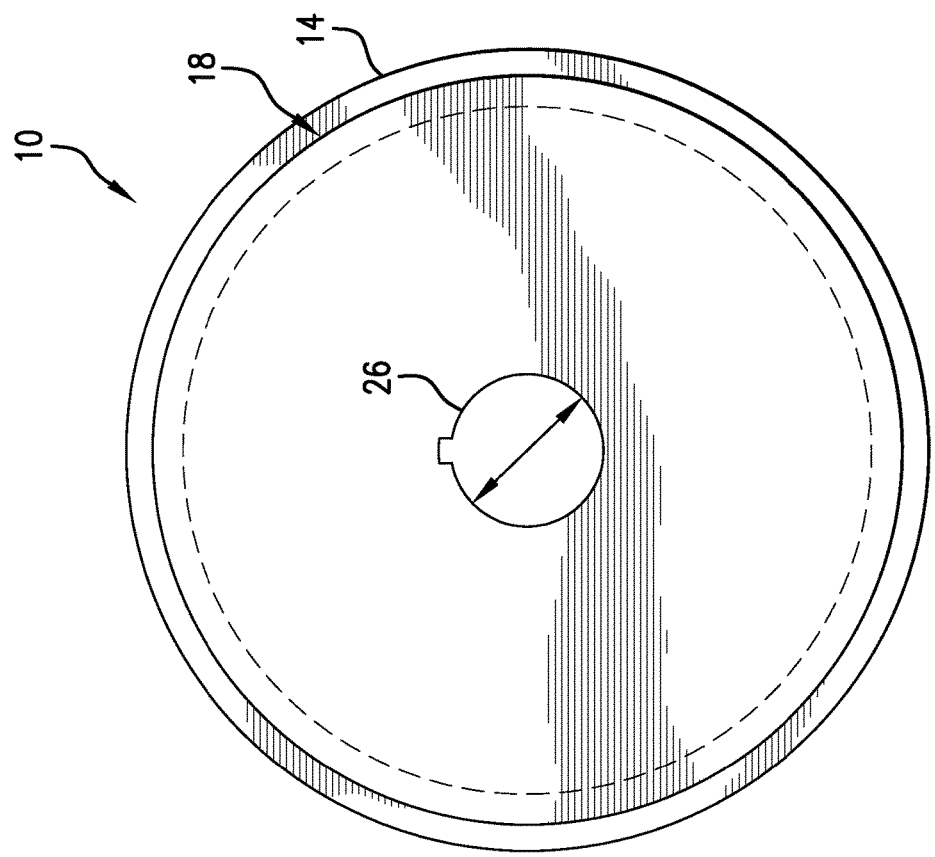
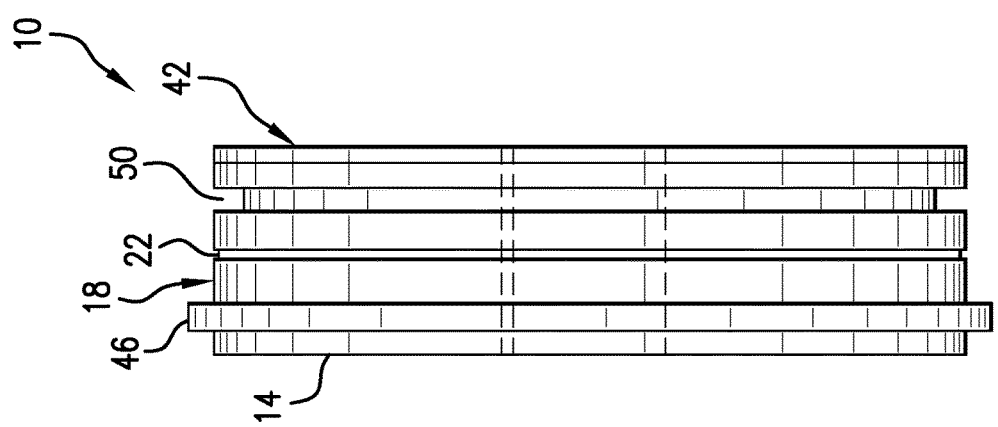

METHOD FOR FORMING AND ANNEALING AN INSULATED CONDUCTOR

BACKGROUND OF THE INVENTION

Insulated conductors are commonly used in electric machines. Such insulated conductors are typically formed into coils or windings to achieve specific characteristics, such as magnetic fields in response to current flow therethrough. To optimize efficiency of the electric machine it is sometimes desirable to pack as much conductor as possible into a finite volume available within the machine. As such the industry may be receptive to new ways of forming insulated conductor to achieve high machine packing densities. The industry may also be receptive to improvements in maintaining high conductivity of the conductor after forming processes that may work harden the insulated conductor.

BRIEF DESCRIPTION OF THE INVENTION

A method of forming an insulated conductor, includes forming an insulated conductor to modify a cross sectional shape thereof; heating at least a portion of the insulated conductor to a selected temperature range; maintaining the selected temperature range for at least a selected period of time thereby annealing the conductor; forming the insulated conductor into a plurality of gable shaped loops; and maintaining insulating properties of an insulation layer of the insulated conductor.

A method of annealing an insulated conductor, includes heating at least a portion of the insulated conductor to a selected temperature; maintaining the selected temperature for at least a selected period of time; and maintaining insulating properties of an insulation layer on the insulated conductor.

A method of forming an insulated conductor, includes forming the insulated conductor thereby altering a cross sectional geometry to a substantially rectangular cross sectional shape; heating at least a portion of the insulated conductor to a temperature less than 750 degrees F.; maintaining the temperature for at least a selected period of time thereby annealing the conductor.

BRIEF DESCRIPTION OF THE DRAWINGS

The following descriptions should not be considered limiting in any way. With reference to the accompanying drawings, like elements are numbered alike:

FIG. 1 depicts an edge view of a roller die disclosed herein;

FIG. 2 depicts a plan view of the roller die of FIG. 1;

DETAILED DESCRIPTION OF THE INVENTION

Figure 3:
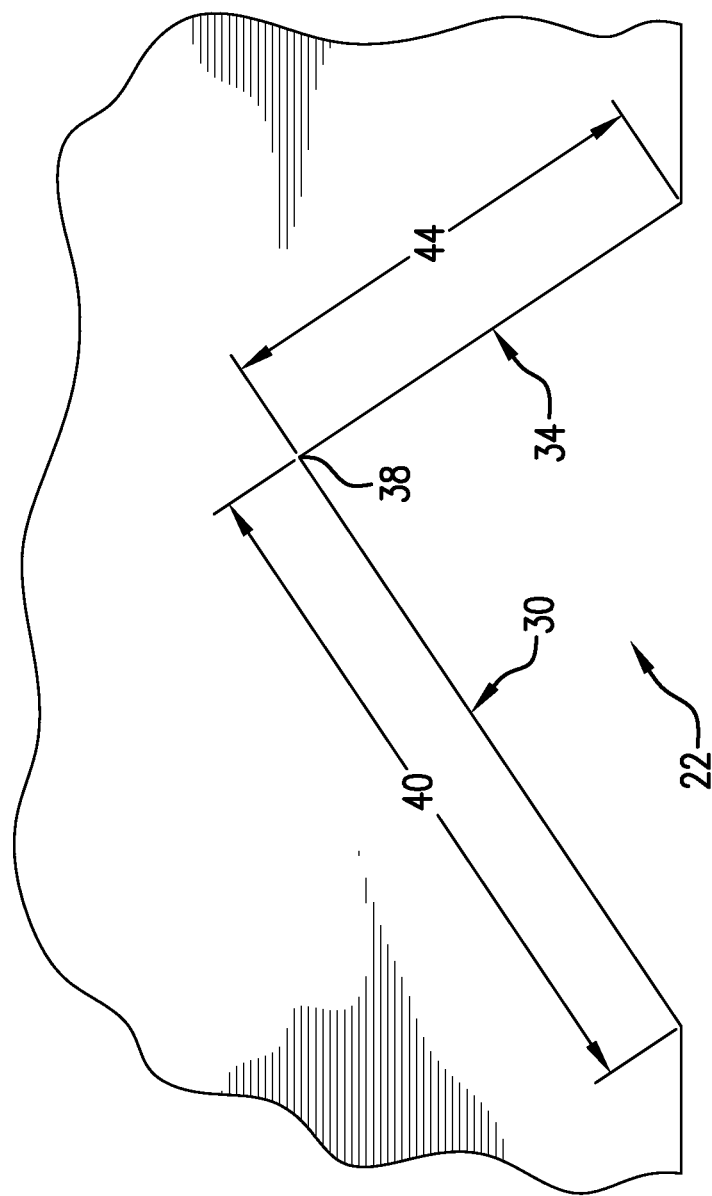
FIG. 3 depicts a magnified view of the groove in the roller die of FIG. 1.

A detailed description of several embodiments of the disclosed apparatus and method are presented herein by way of exemplification and not limitation with reference to the Figures.

An electrical machine, such as an alternator, for example, typically has one or more windings made of an insulated conductor incorporated therein to create magnetic fields required for operation of the machine. Depending upon the particular machine the windings may be disposed at, for example, a stator, a rotor or both. In the case of a stator, for example, a hollow cylindrical stator core may have a plurality of slots formed into a circumferentially inwardly facing surface thereof. Multiple layers of conductor segments from the conductor windings are positioned within each of the slots. All other things being equal, the greater percentage of the slot volume that is filled with conductor the greater the performance of the machine. As such it is desirable to alter the cross sectional shape of the conductor from a circular shape to increase the packing density of the conductor into the slots. A rectangular cross sectional shape, for example, can allow higher packing densities of the slots than a circular cross sectional shape.

Referring to FIGS. 1 and 2, a roller die 10 capable of roll forming a desired cross sectional shape into an insulated conductor is illustrated. To maximize the amount of insulated conductor in a stator, the desired cross sectional shape of the insulated conductor is substantially rectangular. However, the insulated conductor may have other desired cross sectional shapes such as hexagonal, elliptical . . . etc. It is well known to those skilled in the art, that a conductor having a rectangular cross sectional shape may have rounded corners. Prior to forming, the insulated conductor typically will have a substantially circular cross sectional shape. The roller die 10 includes, a cylindrical body 14 with a circumferential outer surface 18 having a groove 22 formed therein. The roller die 10 has a keyhole 26 therethrough located concentrically with the circumferential surface 18. The groove 22 has a specific shape that will be described with reference to FIG. 3 below.

Referring to FIG. 3, a magnified view of the groove 22 in accordance with an embodiment of the invention is illustrated. The groove 22 is depressed into the circumferential surface 18 and extends a full 360 degrees around the circumference of the body 14. The groove 22 includes a first surface 30 and a second surface 34. Both the first surface 30 and the second surface 34 are smooth and flat (in cross section but are actually frustoconical in three dimensions). The first surface 30, in this embodiment, is positioned substantially 90 degrees to the second surface 34 with a small radius 38, or other transitional shape, positioned at the interface of the two surfaces 30, 34. The first surface 30 has a length 40 and the second surface 34 has a length 44. The lengths 40, 44 can be equal to one another or unequal depending upon a desired cross sectional shape of the insulated conductor after the rolling operation is completed.

In order to roll form a cross section of an insulated conductor two of the roller dies 10 are needed. The two roller dies 10 are positioned with their circumferential surfaces 18 tangent to one another and their grooves 22 axially aligned with one another. The two roller dies 10 are, however, oriented such that an axial face 42 (FIG. 1) of one of the roller dies 10 is facing an opposite axial direction to that of the axial face 42 of the other roller die 10. As such a circumferential protrusion 46 extending radially outwardly from the circumferential surface 18 of one of the two roller dies 10 fits within a complementary channel 50 depressing radially inwardly of the circumferential surface 18 of the other roller die 10. Thus, two sets of protrusions 46 riding within corresponding channels 50 axially locate the two roller dies 10 to one another while allowing them to rotate about their respective keyholes 26. The axial dimensions of the protrusions 46 and channels 50 are selected such that the grooves 22 of the two roller dies 10 are axially aligned with one another.

The keyholes 26 in the roller dies 10 allow one or both of the roller dies 10 to be rotationally driven by an electric motor (not shown) or other driving device as is known in the art. The two roller dies 10 are rotated in opposite directions to one another such that frictional engagement of an elongated insulated conductor with the two roller dies 10 causes the insulated conductor to be drawn therebetween. Since the two roller dies 10 are counter-rotating and thereby drawing the insulated conductor therethrough without relative motion between the insulated conductor and the dies 10, the integrity and thus the insulating properties of insulation on the conductor can be maintained. As the conductor is drawn the cross sectional shape of the conductor is reformed to take on the general shape of the opening created by the aligned grooves 22. For example, if surfaces 30 and 34 are 90 degrees to one another the resulting cross sectional shape of the insulated conductor will be a rectangle with dimensions of the length 40 by the length 44. As such, if the lengths 40 and 44 are equal the resulting cross sectional shape will be a square.

Figure 4:
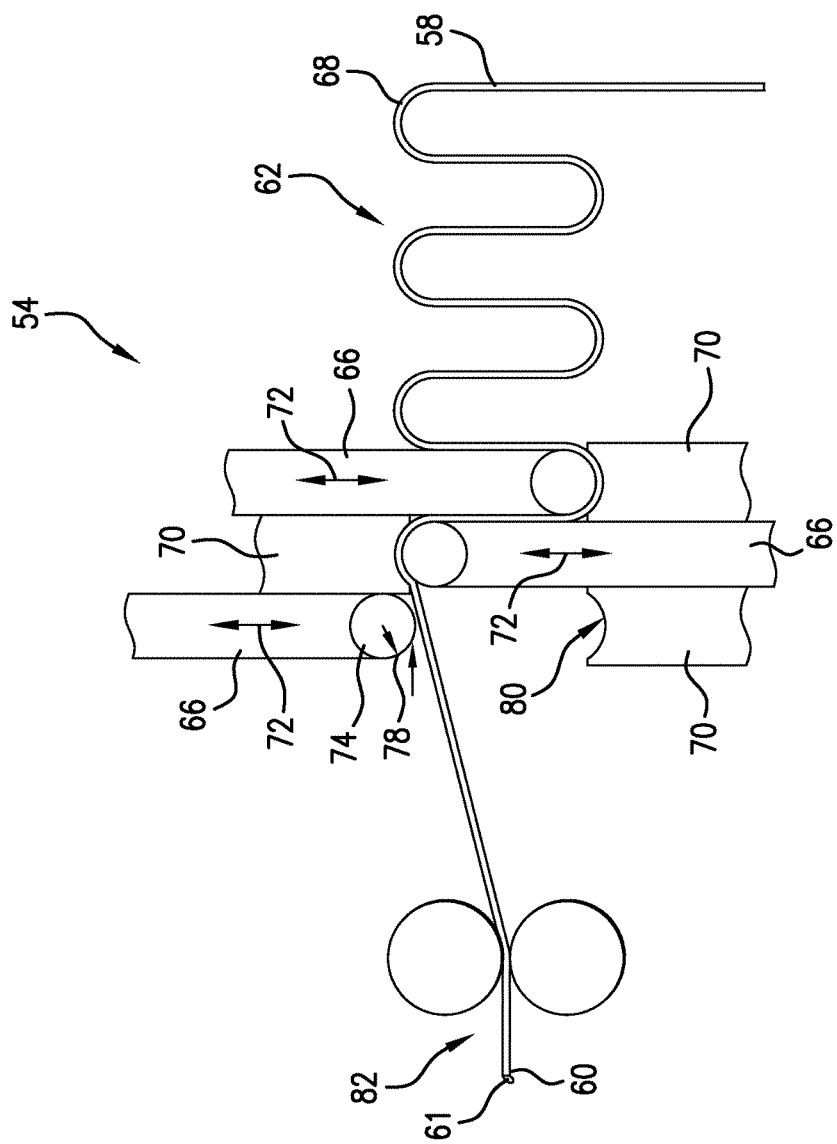
FIG. 4 depicts a plan view of a die assembly disclosed herein.

Referring to FIG. 4, a die assembly 54 for forming an insulated conductor into a sinusoidal shape is illustrated. The die assembly 54 is capable of forming a substantially straight insulated conductor 58, having an insulation layer 60 and a conductor portion 61, into a sinusoidal shape 62. The die assembly 54 includes one or more male dies 66 and one or more female dies 70. One of the male dies 66 and one of the female dies 70 is used for each sinusoidal loop 68 to be formed. In this embodiment the male dies 66 are moveable in a back and forth fashion in the directions of arrows 72 while the female dies 70 are stationary. Each male die 66 has a roller 74 on an end that has an outer radius 78. Each female die 70 has a radius 80 on an end thereof that is complementary to the radius 78. A portion of the insulated conductor 58 is positioned between the male dies 66 and the female dies 70. The male dies 66 are sequentially actuated such that each male die 66 in turn moves toward the corresponding female die 70 thereby contacting the insulated conductor 58 in the process. A portion of the insulated conductor 58 beyond the portion being formed is locked in position by conventional means and/or by the clamping action of one of the male dies 66 against one of the female dies 70. As each subsequent male die 66 strokes the roller 74 engages the insulated conductor 58 and rotates as additional length of insulated conductor 58 is drawn in from a conductor feeding apparatus 82. The stroke of each of the male dies 66 is complete upon contact with the corresponding female die 70, at which point one of the sinusoidal loops 68 is completely formed. The radii 78, 80 are selected based on the desired finished radii of the loops 68.

The rolling actions of the rollers 74, minimize friction, and thereby minimize damage to the insulation layer 60 on the insulated conductors 58. As such, the die assembly 54 forms the insulated conductor 58 into the sinusoidal shape 62 while maintaining the insulating properties of the insulation layer 60. The sinusoidal shape 62, however, is an intermediary shape; the final shape of the insulated conductor 58 is a plurality of gable shaped loops that each have an optional planer offset. Reforming the insulated conductor 58 from the sinusoidal shape 62 into a gable shape is accomplished with a second die assembly that will be described next.

Figure 5:
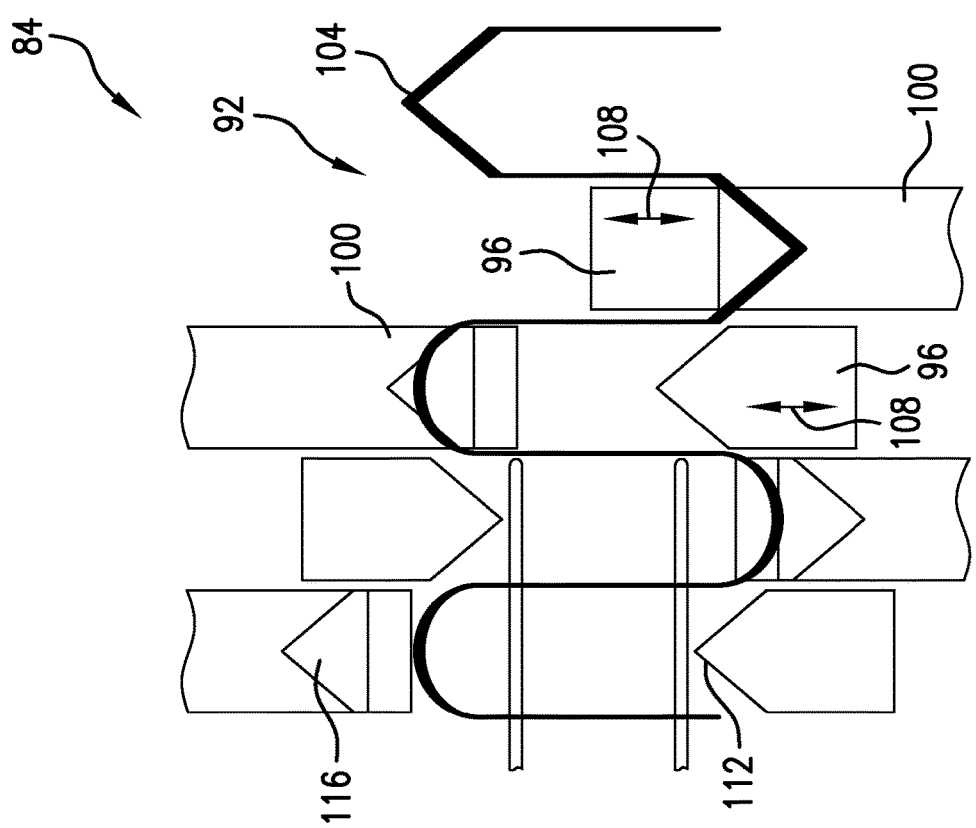
FIG. 5 depicts a plan view of second die assembly disclosed herein.

Referring to FIG. 5, die assembly 84, for forming the insulated conductor 58 into a gable shape 92, is illustrated.

The die assembly 84 includes at least one male die 96 and at least one female die 100. One of the male dies 96 and one of the female dies 100 are used together in the formation of each gable loop 104. In this embodiment the male dies 96 are moveable in a back and forth fashion in the directions of arrows 108 and the female dies 100 are stationary. Each male die 96 has a gable point 112 on one end and each female die 100 has a depression 116 on one end thereof that is complementary to the gable point 112. A sinusoidal shaped 62 insulated conductor 58 is positioned within the die assembly 84 such that each of the sinusoidal loops 68 is aligned between a male die 96 and a female die 100. The male dies 96 are then actuated such that they are moved toward a corresponding female die 100 reforming the sinusoidal shape 62 of each loop to a gable shape 92. Unlike the die assembly 54 no particular order of actuation of the male dies 96 of die assembly 84 is required as the insulated conductor 58 does not move relative to the male dies 96. Similarly, dies in a die assembly to form a planar offset in the conductor 58 need not be controlled in a particular order.

Figure 6:
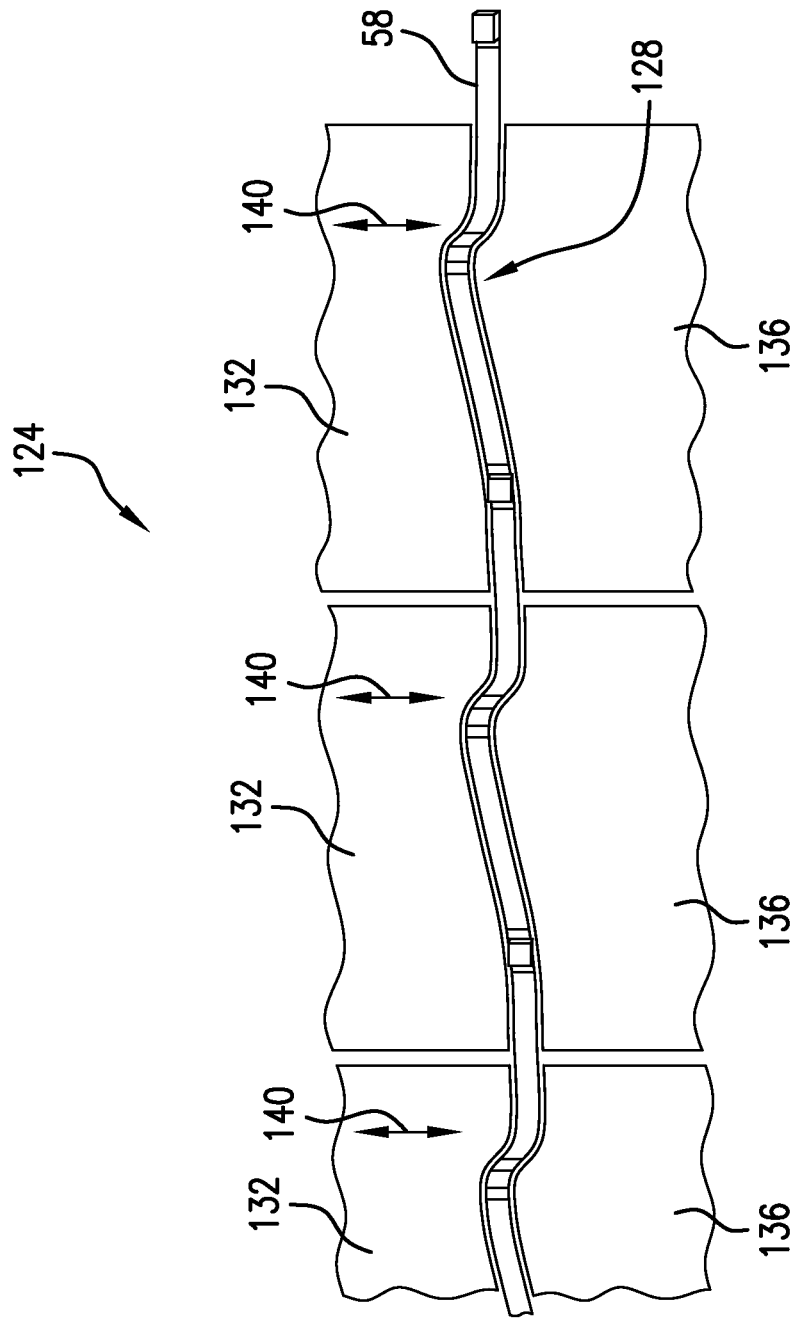
FIG. 6 depicts an elevation view of a third die assembly disclosed herein.

Referring to FIG. 6, an optional third die assembly 124 to form an optional planar offset crimp 128 in the insulated conductor 58 is illustrated. The die assembly 124 has at least one first die 132 and at least one second die 136. The first dies 132, in this embodiment, move in an up and down fashion in the directions of arrows 140, while the second dies 136 are stationary. The die assembly 124 forms the planar offset crimp 128 in the insulated conductor 58. This offset crimp 128 allows the conductor 58 to be more efficiently packed into a stator (not shown), for example, that has a hollow cylindrical core with radially inwardly opened slots.

The three die assemblies 54, 84 and 124 can be fed an insulated conductor 58 that is one continuous piece, for example, that is wound about a spool prior to and after being processed through each of the die assemblies 54, 84, 124. Alternately, the three die assemblies 54, 84 and 124 can be fed portions of the insulated conductor 58 that has been cut into selected lengths prior to being fed to each of the die assemblies 54, 84 and 124.

Regardless of whether the insulated conductor 58 is one long piece or cut into smaller portions, it may be desirable to anneal the conductor 58 prior to installation into an electric machine. Annealing decreases a level of work hardening that has occurred in the conductor 58. Metals that are used as electrical conductors such as copper, for example, become work hardened due to application of stress that results in permanent deformation of the metal. Continuing to deform such a conductor that has reached its maximum level of work hardening can cause the metal to rupture or break, which can render it defective to the point of being useless in an electric machine. Work hardening also causes the resistivity of the metal to increase, which is undesirable in a machine since it can have a detrimental effect on efficiency and performance of the electric machine. It may, therefore, be desirable to anneal conductors 58 one or more times during a forming process to avoid material rupture and minimize the electrical resistance.

Figure 7:
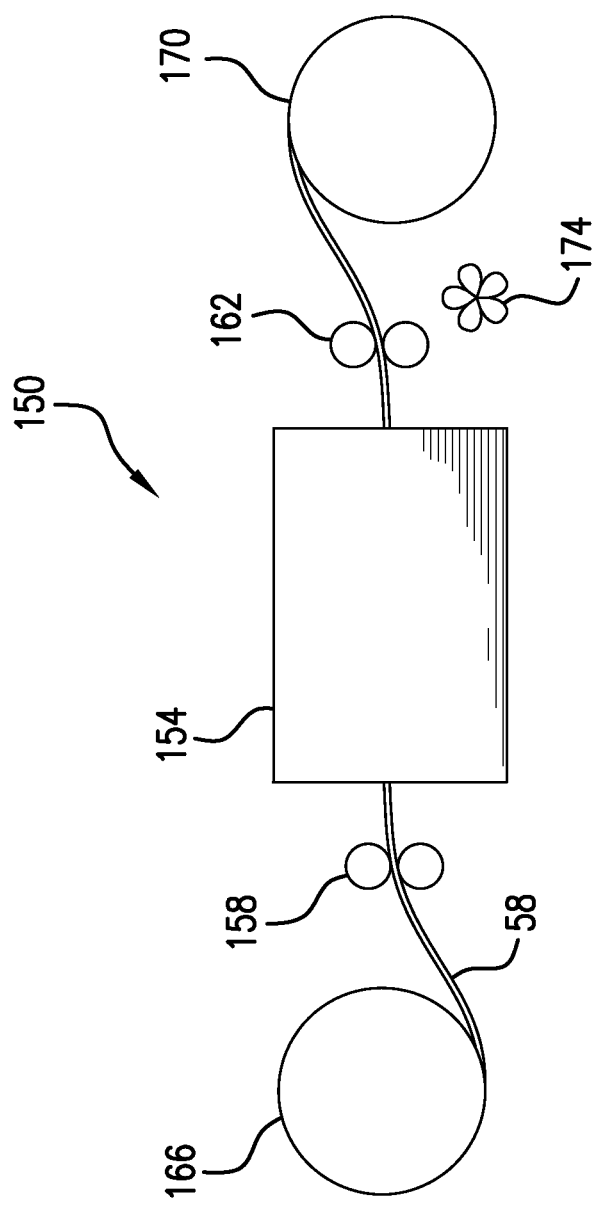
FIG. 7 depicts an elevation view of conductor annealing machine disclosed herein.

Referring to FIG. 7, an inline conductor annealing machine 150 is illustrated. The machine 150 among other things includes a convection oven 154, conductor feeding equipment 158, conductor withdrawing equipment 162, a conductor supply spool 166 and a conductor take up spool 170. The insulated conductor 58 unwinds from the supply spool 166 and is fed through the conductor feeding equipment 158 into the oven 154. Simultaneously, the withdrawing equipment 162 and take up spool 170 withdraw the conductor 58 from the oven 154 and wind it onto the take up spool 170. Optional cooling equipment such as a fan 174, for example, may be employed to reduce the temperature of the conductor 58 prior to winding the conductor 58 onto the take up spool 170.

The oven 154 has one or more controlled temperature zones that heat the insulated conductor 58 as it passes through the oven 154. Several factors, such as, the size of the oven 154, the temperatures within the oven 154 and the speed at which the conductor 58 travels through the oven 154, for example, determine the temperature versus time profile that the insulation layer 60 and the conductor portion 61 of the insulated conductor 58 actually encounter. This is important since there is a relationship between time and temperature for each metal used for the conductor portion 61 to achieve full annealing. Typically, the relationship is such that the higher the temperature the less time required to anneal, and conversely the lower the temperature the longer the time required to anneal. There are limits at both extreme temperatures that should be avoided, as too high of a temperature and the insulation layer 60 may be detrimentally damaged thereby losing some insulating properties, and too low a temperature and annealing will not take place or the process time is so long that it becomes costly and noncompetitive. It is important to not achieve a temperature of the insulation layer 60 greater than the melting temperature of the insulation. Amid/imide is a common conductor insulation used for its high temperature properties and high mechanical abrasion properties. The melting temperature of amid/imide is 750 degrees F. For cosmetic reasons, it may also be important to keep the temperature of the amid/imide insulation layer 60 less than a temperature that discolors the insulation—this temperature is about 600 degrees F. for amide/imide. The annealing temperatures and times for which to hold the annealing temperatures, therefore, should be selected by taking into account the fore mentioned factors. For copper insulated conductors 58, which have a 100% amide/imide insulation layer 60 and copper conductor portion 61, for example, oven temperatures of between 900 and 950 degrees Fahrenheit for periods of time between 47 and 67 seconds can be used to anneal the copper conductor portion 61. More specifically a temperature of 925 degrees Fahrenheit for a time of 57 seconds has shown to both anneal the copper conductor portion 61 while keeping the insulation layer 60 less than 600 degrees F. to maintain the insulating properties and color of the insulation layer 60.

A continuous piece of insulated conductor 58 traveling through an oven 154 as described herein is one embodiment for annealing a work hardened insulated conductor 58. In another embodiment, the annealing process can be performed after any of the forming operations described herein as long as appropriate measures are taken to handle and spool if necessary, the conductor 58 at the variously formed stages. These formed stages include the insulated conductor 58 formed in the sinusoidal shape 62, or in the shape of a plurality of gable shaped loops or in the final shape of a plurality of gable shaped loops that each have an optional planar offset. These formed stages can be run through the oven 154 for annealing the work hardened insulated conductor 58. Alternate embodiments could anneal smaller (cut) portions of the conductor 58 one at a time. Such cut portions could be fed in a continuously moving process through the oven 154 or through a batch type process, wherein the cut portions are placed in a stationary fashion within the oven 154, for example, during the heating and annealing process. In a batch type process, the large mass of insulated conductor 58 acts as a large heat sink and the time and temperature of the oven will have to be modified from the above mentioned settings. Also, the heating of the batch of wire may in some cases be uneven and a high annealing temperature of 925 degrees may cause some of the insulation on the insulated conductor 58 to discolor and become damaged. The inventors have completed studies for a 15 pound spool of insulated conductor 58 that show the ideal temperature of the oven 154 is about 460±120 degrees F. and the time in the oven 154 to be about 30 minutes or more. These temperatures and time result in a nicely annealed insulated conductor 58 that shows no insulation damage or discoloration. The time in the oven 154 may have to be increased for larger mass spools and may be decreased for smaller mass spools. Still other alternate embodiments could use methods other than convection to achieve the necessary heating. Such methods include heating conductively, inductively and radiatively, for example. These methods could be used alone or in combinations. As long as the necessary temperature versus time profiles are met, the method used to heat the conductor portion 61 is a secondary consideration.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims.

What is claimed is:

1. A method of forming an insulated conductor having an insulation layer, comprising:
    forming an insulated conductor to modify a cross sectional shape thereof from a substantially round cross section to a substantially rectangular cross section by drawing the insulated conductor between a pair of roller dies; then
    forming the insulated conductor into a plurality of gable shaped loops by positioning the insulated conductor within a die assembly; and then after the forming of the plurality of gable shapes
    heating at least a portion of the insulated conductor having the modified cross sectional shape to a selected temperature range;
    maintaining the selected temperature range for at least a selected period of time thereby annealing the insulated conductor and thereby maintaining insulating properties of the insulation layer of the insulated conductor.

2. The method of forming an insulated conductor of claim 1, wherein the method further comprises cutting the insulated conductor to a selected length.

3. The method of forming an insulated conductor of claim 1, further comprises forming planar offsets into each of the plurality of gable shaped loops.

4. The method of forming an insulated conductor of claim 1, wherein the heating of at least a portion of the insulated conductor to a selected temperature range and the maintaining the selected temperature range for at least a selected period of time thereby annealing the insulated conductor is repeated at least once.

5. The method of forming an insulated conductor of claim 1, wherein the heating of at least a portion of the insulated conductor to a selected temperature range and the maintaining the selected temperature range for at least a selected period of time thereby annealing the insulated conductor further comprises an inline oven and the oven temperature is in a range of 900 to 950 degrees Fahrenheit for a time of between 47 to 67 seconds.

6. The method of forming an insulated conductor of claim 5, wherein the oven temperature is approximately 925 degrees Fahrenheit and the time is approximately 57 seconds.

7. The method of forming an insulated conductor of claim 5, wherein the insulated conductor is insulated with an amide/imide insulation layer and a conductor portion of the insulated conductor is made of copper.

8. The method of forming an insulated conductor of claim 1, wherein the heating of the at least a portion of the insulated conductor to a selected temperature range and the maintaining the selected temperature range for at least a selected period of time thereby annealing the insulated conductor further comprises a batch oven and the oven temperature is in a range of 460±120 degrees F.

9. The method of forming an insulated conductor of claim 8, wherein the selected period of time is at least about 30 minutes.

10. The method of forming an insulated conductor of claim 1, wherein the insulated conductor is insulated with an amide/imide insulation layer and a conductor portion of the insulated conductor is made of copper and the heating does not increase a temperature of the insulation over 750 degrees F.

11. The method of forming an insulated conductor of claim 10, wherein the heating does not increase the temperature of the insulation over 600 degrees F.

12. The method of forming an insulated conductor of claim 1, further comprising de-spooling from a first spool and respooling onto a second spool the insulated conductor.

13. The method of forming an insulated conductor of claim 1, further comprising cooling the insulated conductor.

14. The method of forming an insulated conductor of claim 1 wherein the heating is performed convectively.

15. The method of forming an insulated conductor of claim 1 wherein the heating is performed radiatively.

16. The method of forming an insulated conductor of claim 1 wherein the heating is performed conductively.

17. The method of forming an insulated conductor of claim 1 wherein the heating is performed inductively.

\* \* \* \* \*